United States Patent
Zhang et al.

(10) Patent No.: US 10,678,357 B2
(45) Date of Patent: Jun. 9, 2020

(54) ELECTRODE STRUCTURE, METHOD OF MANUFACTURING THE SAME, TOUCH PANEL, AND TOUCH DISPLAY DEVICE

(71) Applicants: BOE TECHNOLOGY GROUP CO., LTD., Beijing (CN); ORDOS YUANSHENG OPTOELECTRONICS CO., LTD., Inner Mongolia (CN)

(72) Inventors: Wei Zhang, Beijing (CN); Kunpeng Zhang, Beijing (CN); Xiaozhou Zhan, Beijing (CN); Hui Li, Beijing (CN)

(73) Assignees: BOE TECHNOLOGY GROUP CO., LTD., Beijing (CN); ORDOS YUANSHENG OPTOELECTRONICS CO., LTD., Inner Mongolia (CN)

( * ) Notice: Subject to any disclaimer, the term of this patent is extended or adjusted under 35 U.S.C. 154(b) by 15 days.

(21) Appl. No.: 15/535,430

(22) PCT Filed: Jan. 10, 2017

(86) PCT No.: PCT/CN2017/070733
§ 371 (c)(1),
(2) Date: Jun. 13, 2017

(87) PCT Pub. No.: WO2017/190528
PCT Pub. Date: Nov. 9, 2017

(65) Prior Publication Data
US 2018/0196557 A1    Jul. 12, 2018

(30) Foreign Application Priority Data
May 5, 2016    (CN) .......................... 2016 1 0291071

(51) Int. Cl.
*G06F 3/041* (2006.01)
*G06F 3/044* (2006.01)

(52) U.S. Cl.
CPC ............ *G06F 3/0412* (2013.01); *G06F 3/044* (2013.01); *G06F 2203/04103* (2013.01)

(58) Field of Classification Search
CPC ...... G06F 3/044; G06F 3/0416; G06F 3/0412; G06F 2203/04112; G06F 2203/04103
See application file for complete search history.

(56) References Cited

U.S. PATENT DOCUMENTS

| 8,179,381 B2 * | 5/2012 | Frey | ........................ | G06F 3/044 345/174 |
| 8,665,230 B2 * | 3/2014 | Liu | ........................ | G06F 3/044 345/173 |

(Continued)

FOREIGN PATENT DOCUMENTS

| CN | 103293785 A | 9/2013 |
| CN | 104331205 A | 2/2015 |

(Continued)

OTHER PUBLICATIONS

Search Report for International Application No. PCT/CN2017/070733 dated Nov. 10, 2016.

*Primary Examiner* — Christopher E Leiby
(74) *Attorney, Agent, or Firm* — Calfee, Halter & Griswold LLP (57) ABSTRACT

An electrode structure is disclosed, including: a plurality of first electrodes, which transfer an electrical signal; and a plurality of second electrodes, which do not transfer the electrical signal, wherein the first electrode and the second electrode are electrically separated from each other, the second electrode and the first electrode are alternately arranged, each of the second electrodes includes electrodes electrically separated from each other, and in the electrodes (Continued)

electrically separated from each other, some separation borders not perpendicular to an extending direction of the first electrode can be connected to form an oblique connecting line with respect to the extending direction. Further, a method of manufacturing an electrode structure, a touch panel and a touch display device are disclosed.

14 Claims, 5 Drawing Sheets

(56) References Cited

U.S. PATENT DOCUMENTS

| | | | | |
|---|---|---|---|---|
| 8,698,767 | B2* | 4/2014 | Kwak | G06F 3/044 178/18.05 |
| 9,036,094 | B2* | 5/2015 | Ishizaki | G06F 3/0412 349/12 |
| 9,454,279 | B2* | 9/2016 | Nakanishi | G02F 1/13338 |
| 9,494,815 | B2 | 11/2016 | Ma et al. | |
| 9,736,933 | B2* | 8/2017 | Iwami | B32B 7/02 |
| 2012/0268418 | A1* | 10/2012 | Ishizaki | G06F 3/0412 345/174 |
| 2014/0176465 | A1 | 6/2014 | Ma et al. | |
| 2015/0177872 | A1 | 6/2015 | Kim et al. | |
| 2015/0212537 | A1* | 7/2015 | Cok | G06F 3/046 345/174 |
| 2016/0103526 | A1* | 4/2016 | Sohn | G06F 3/044 345/174 |
| 2016/0147344 | A1 | 5/2016 | Yuan et al. | |

FOREIGN PATENT DOCUMENTS

| | | |
|---|---|---|
| CN | 105487270 A | 4/2016 |
| CN | 106020527 A | 10/2016 |
| EP | 2746840 A1 | 6/2014 |

* cited by examiner

Fig. 5

ELECTRODE STRUCTURE, METHOD OF MANUFACTURING THE SAME, TOUCH PANEL, AND TOUCH DISPLAY DEVICE

CROSS-REFERENCE TO RELATED APPLICATIONS

The present application is based upon International Application No. PCT/CN2017/070733, filed on Jan. 10, 2017, which is based upon and claims priority to Chinese Patent Application No. 201610291071.0, filed May 5, 2016, which is hereby incorporated by reference in its entirety as part of this application.

TECHNICAL FIELD

Embodiments of the present disclosure relate to an electrode structure, a method of manufacturing the same, a touch panel, and a touch display device.

BACKGROUND

At present, there are often many electrode structures in a product. For example, a touch panel includes a touch electrode structure. Different electrode structures will generally produce different visual effects, resulting in different product quality and user experience. For example, in an in cell type of touch panel, a pattern design of a strip type or a zigzag type may lead to poor user experience, such as obvious moire pattern, unsatisfactory shadow elimination effect or the like. Among other types of products, the electrode structure also affects product quality and user experience. Therefore, there is a need to improve the electrode structure.

It should be noted that, information disclosed in the above background portion is provided only for better understanding of the background of the present disclosure, and thus it may contain information that does not form the prior art known by those skilled in the art.

SUMMARY

According to a first aspect of the present disclosure, an embodiment of the present disclosure provides an electrode structure. The electrode structure comprises a plurality of first electrodes, which transfer an electrical signal; and a plurality of second electrodes, which do not transfer the electrical signal, wherein the first electrode and the second electrode are electrically separated from each other, the second electrode and the first electrode are alternately arranged, each of the second electrodes comprises a plurality of electrodes electrically separated from each other, and in the electrodes electrically separated from each other, some separation borders not perpendicular to an extending direction of the first electrode can be connected to form an oblique connecting line with respect to the extending direction.

According to a second aspect of the present disclosure, an embodiment of the present disclosure provides a method of manufacturing an electrode structure. The method comprises: designing a mask pattern in accordance with the electrode structure of any one of the embodiments described as above; depositing a transparent conductive film; coating a photoresist on the transparent conductive film; exposing and developing the photoresist using the mask pattern, such that the photoresist on the transparent conductive film forms the electrode structure of any one of the embodiments described as above; and performing etching and peeling off.

According to a third aspect of the present disclosure, an embodiment of the present disclosure provides a touch panel. The touch panel comprises the electrode structure described in any one of the embodiments described as above.

According to a fourth aspect of the present disclosure, an embodiment of the present disclosure provides a touch display device. The touch display device comprises the touch panel of the embodiments described as above.

It is to be understood that both the foregoing general description and the following detailed description are exemplary and explanatory only and are not restrictive of the invention, as claimed.

This section provides a summary of various implementations or examples of the technology described in the disclosure, and is not a comprehensive disclosure of the full scope or all features of the disclosed technology.

BRIEF DESCRIPTION OF THE DRAWINGS

Reference is now made to the accompanying drawings, which are only exemplary and not necessarily to scale, wherein.

In the drawings, for ease of understanding, the same or similar reference has been used to refer to elements that have substantially the same or similar structures and/or the same or similar functions.

DETAILED DESCRIPTION

Embodiments of the present disclosure will be described below with reference to the accompanying drawings. In the following description, numerous specific details are set forth in order to provide a more complete understanding and implementation of the present disclosure for those skilled in the art. However, it will be apparent to those skilled in the art that the present disclosure may be implemented without some of these specific details. In addition, it is to be understood that the disclosure is not limited to the specific embodiments described. Rather, it is contemplated that the present disclosure may be practiced with any combination of features and elements described below, whether or not they relate to different embodiments. Accordingly, the following aspects, features, embodiments and advantages are for illustrative purposes only and are not to be regarded as an element or limitation of the claims, unless expressly stated in the claims.

It is to be noted that in the electrode structures shown in the figures, a solid line denotes an electrical disconnection, and a region surrounded by the solid line indicates a region that can be electrically conductive.

As used herein, the word "oblique" refers to a direction that is neither parallel nor perpendicular to a reference direction (e.g., "extending direction" hereinafter). For example, an angle formed by the "oblique line" as used herein with respect to the reference direction is any angle that does not include 0 degree and 90 degrees. In addition, as used herein, the word "oblique connecting line" is defined as a straight line that is connected from a starting point of the oblique connecting line to any point of the oblique connecting line other than the starting point, which is oblique with respect to the reference direction (for example, the extending direction).

The design of the electrode structure often takes into account a number of factors. For example, in the electrode design and production process of the touch screen, the shadow elimination of the electrode is an issue which needs to be focused. A difference between an optical transmittance and a reflectivity of a transparent electrode pattern made of such as ITO (indium tin oxide) tends to cause an effect of visual electrode shadow, and the structural design of the transparent electrode pattern has a great influence on the shadow elimination effect. In a touch display such as an in cell type, an Rx touch electrode is typically disposed on a color film (CF) layer. As described above, the pattern design of the strip type or the zigzag type may result in more pronounced moire pattern and unsatisfactory shadow elimination effect. The pattern having a diamond shape (the pattern of the dummy electrodes shown in FIG. 1) has better shadow elimination effect, and also meets the touch requirements. However, although the pattern having a diamond shape can enhance the shadow elimination effect, there is a problem of a grainy picture, thereby affecting product quality and user experience.

Figure 1:
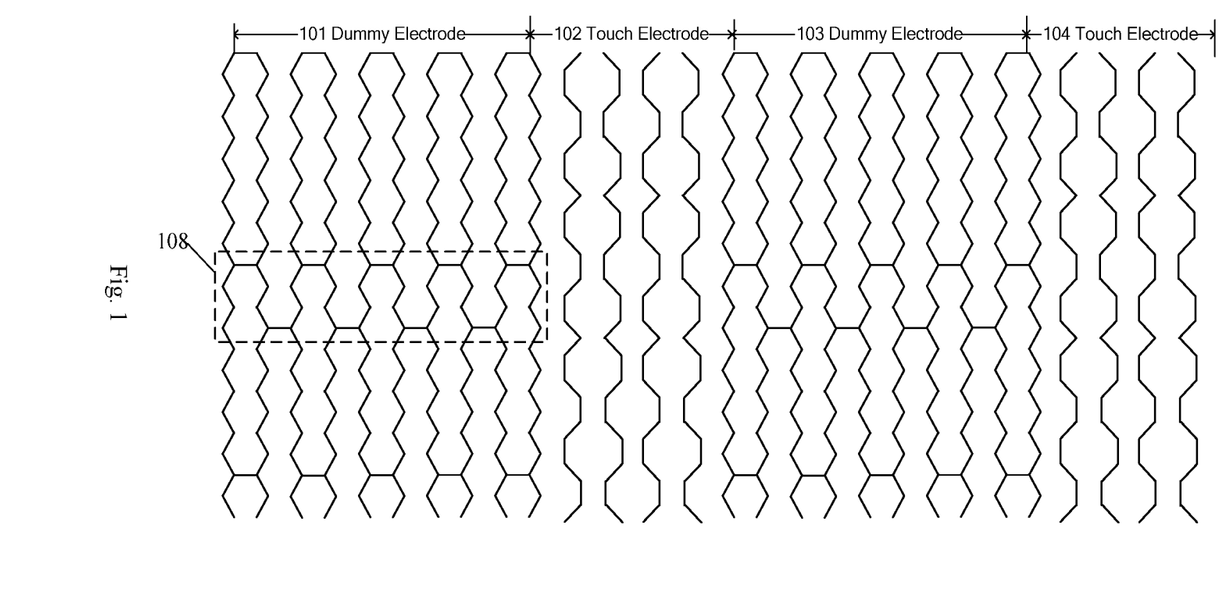
FIG. 1 shows a schematic view of an electrode structure.

FIG. 1 shows a partial schematic view of an Rx touch electrode structure used in an in cell type touch display. As shown in FIG. 1, the electrode structure comprises a plurality of dummy electrodes 101, 103, and a plurality of touch electrodes 102, 104. The touch electrodes 102, 104 are electrically separated from the dummy electrodes 101, 103, and the touch electrodes 102, 104 and the dummy electrodes 101, 103 are alternately arranged. For example, as shown in FIG. 1, the electrodes are arranged in an order of a dummy electrode 101, a touch electrode 102, a dummy electrode 103 and a touch electrode 104. Further, the touch electrode is arranged to be consisted of an octagonal pattern. The dummy electrode is arranged to be consisted of a plurality of patterns having a hexagonal shape.

However, the touch electrode structure shown in FIG. 1 has a problem of a grainy picture. For example, in the case of a white picture or a picture having high brightness, since the dummy electrode is consisted of a plurality of patterns having a hexagonal shape, and the dummy electrodes are separated, the area shown in for example block 108 of FIG. 1 will form microscopic hexagonal shapes. If it is observed macroscopically with the naked eye, particles having a lot of small hexagonal patterns will be felt. Therefore, an improved electrode structure is required.

It is to be noted that, although the embodiments of the present disclosure are discussed primarily in the context of the in cell type touch panel, the electrode structure according to embodiments of the present disclosure may also be applied to any other suitable product, and may not be limited to in cell type touch panels.

As used herein, the first electrode and the second electrode may be a transparent conductive film, such as an ITO film, a zinc oxide indium (IZO) film, a zinc gallium oxide (ZGO) film, a zinc indium gallium oxide (IZGO) film, a zinc oxide (ZnO) film, an AZO (aluminum zinc oxide) film, or other transparent conductive film that may be suitable or later developed. In addition, the first electrode and the second electrode may be made of the same material.

Figure 2:
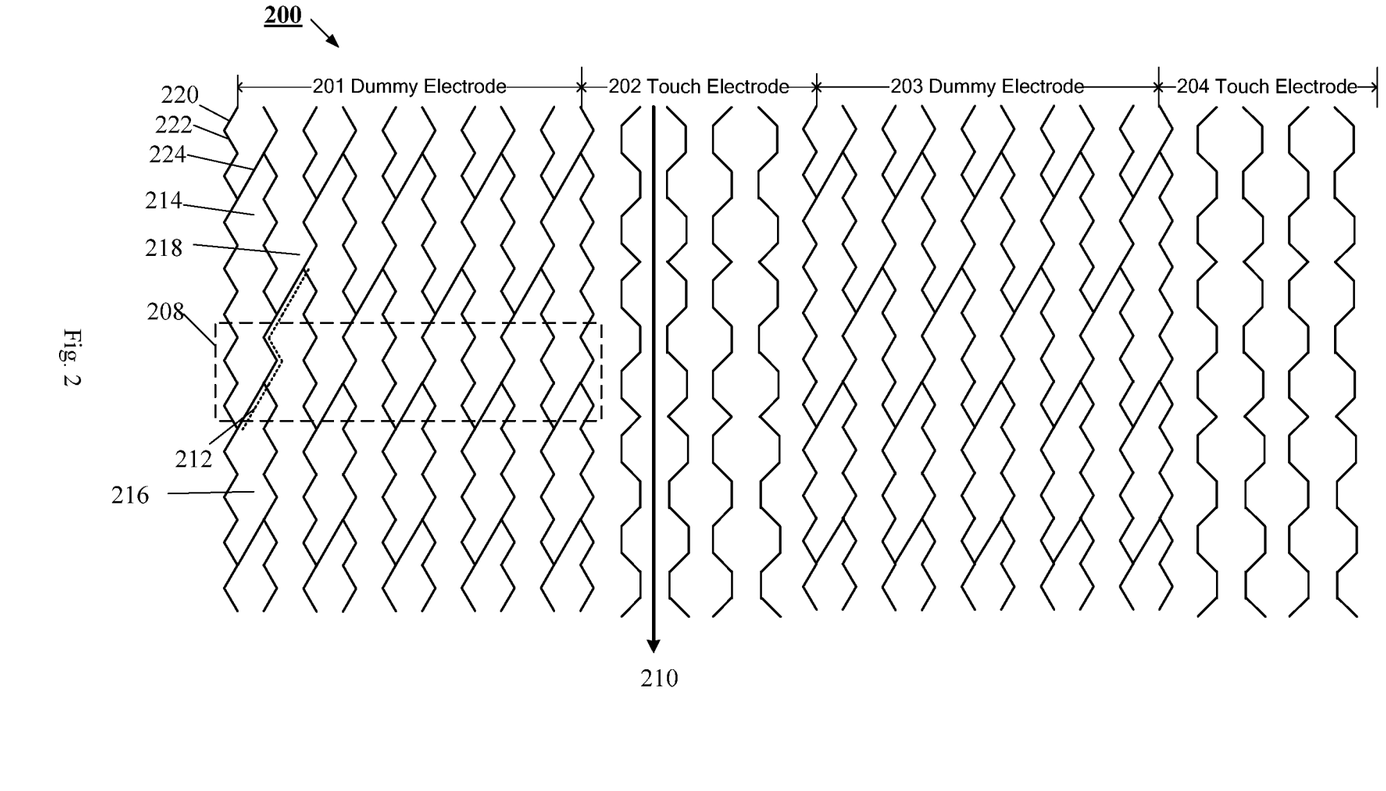
FIG. 2 shows a schematic view of an electrode structure according to an embodiment of the present disclosure.

FIG. 2 shows a partial schematic view of an electrode structure 200 according to an embodiment of the present disclosure. In one embodiment, the electrode structure may be applied to the touch electrode structure, and for example may be applied to the Rx touch electrode structure of an in cell type touch display.

As shown in FIG. 2, the electrode structure 200 comprises a plurality of dummy electrodes 201, 203 (referred to as second electrode(s) hereinafter) and a plurality of touch electrodes 202, 204 (referred to as first electrode(s) hereinafter). The first electrodes transfer an electrical signal such as a touch signal, and the second electrodes do not transfer an electrical signal. The touch electrodes 202, 204 are electrically separated from the dummy electrodes 201, 203, and the touch electrodes 202, 204 and the dummy electrodes 201, 203 are alternately arranged. For example, as shown in FIG. 2, the electrodes are arranged in an order of the dummy electrode 201, the touch electrode 202, the dummy electrode 203 and the touch electrode 204. Further, the touch electrodes 202, 204 are arranged to be primarily consisted of octagonal patterns. In another embodiment, the touch electrodes 202, 204 may be arranged in any other suitable electrode structure, and is not limited herein. Moreover, as shown in FIG. 2, the touch electrode 202 may comprise a plurality of electrically separated conductive areas. Each of the dummy electrodes 201, 203 comprises electrodes electrically separated from each other, and in the electrodes electrically separated from each other, some separation borders which are not perpendicular to an extending direction of the first electrode may be connected to form an oblique connecting line with respect to the extending direction. For example, the dummy electrode 201 comprises electrodes 214, 216, 218, . . . , which are electrically separated from each other. In another embodiment, the dummy electrode 201 may comprise more or less types of electrodes which are electrically separated from each other.

In FIG. 2, the extending direction of the first electrode (touch electrodes 202, 204) may be a direction shown by a reference numerical 210 in FIG. 2. It can be seen from FIG. 2 that the dotted line indicated by the reference numerical 210 is the oblique connecting line with respect to the extending direction, which is formed by connecting some separation borders which are not perpendicular to the extending direction 210. By contrast, there is no such oblique connecting line in the electrode structure of FIG. 1.

In this embodiment, a pattern of each of the electrodes electrically separated from each other is defined by the oblique separation borders with respect to the extending direction 210, and some oblique separation borders of the electrodes electrically separated from each other can be connected to form an oblique connecting line with respect to the extending direction 210. As shown in FIG. 2, the electrodes 214, 216 and 218, which are electrically separated from each other, are separated by oblique separation borders, and it can be seen from block 208 that the dotted line indicated by a reference numerical 212 is the oblique connecting line connected by some oblique separation borders.

In this embodiment, angles formed by some oblique separation borders of the electrodes electrically separated from each other and the extending direction 210 are 30 degrees, and angles formed by other oblique separation borders and the extending direction 210 is 150 degrees. For example, in FIG. 2, angles formed by oblique separation borders 220, 224 and the extending direction 210 are 30 degrees, and an angle formed by an oblique separation border 222 and the extending direction 210 is 150 degrees.

In another embodiment, the angle formed by the oblique separation border 224 and the extending direction 210 in FIG. 2 may be any other suitable angle (i.e., they are not perpendicular to each other), such as 60 degrees, 70 degrees, 80 degrees and the like. Moreover, the position of the separation border 224 may also be varied, and not limited to the position shown in FIG. 2. Further, it is to be noted that the angle formed by the oblique separation border and the extending direction described as above is only an example, and in another embodiment, the angle formed by the oblique separation border and the extending direction may also be any other suitable angle.

It is to be noted that the electrode structure in FIG. 2 is only an example embodiment that satisfies the features described as above with respect to the electrode structure 200. In another embodiment, there are also other electrode structures that satisfy the features of the electrode structure 200. For example, the interval between the oblique separation borders 224 may be greater or smaller.

The electrode structure in the above embodiment may effectively improve the problem of a grainy picture. For example, in the case of a white picture or a picture having high brightness, the problem of a grainy picture may be avoided due to the design of the oblique separation border. For example, in block 108 of FIG. 1, a hexagonal pattern may be clearly viewed, while in block 208 of FIG. 2, due to the incorporation of the oblique separation borders 224, there is obviously not a hexagonal pattern, such that the reflection is carried out in various directions. Therefore, the electrode structure of the above embodiment can effectively improve the problem of a grainy picture, has a better shadow elimination effect, and can also meet the touch requirements.

Figure 3:
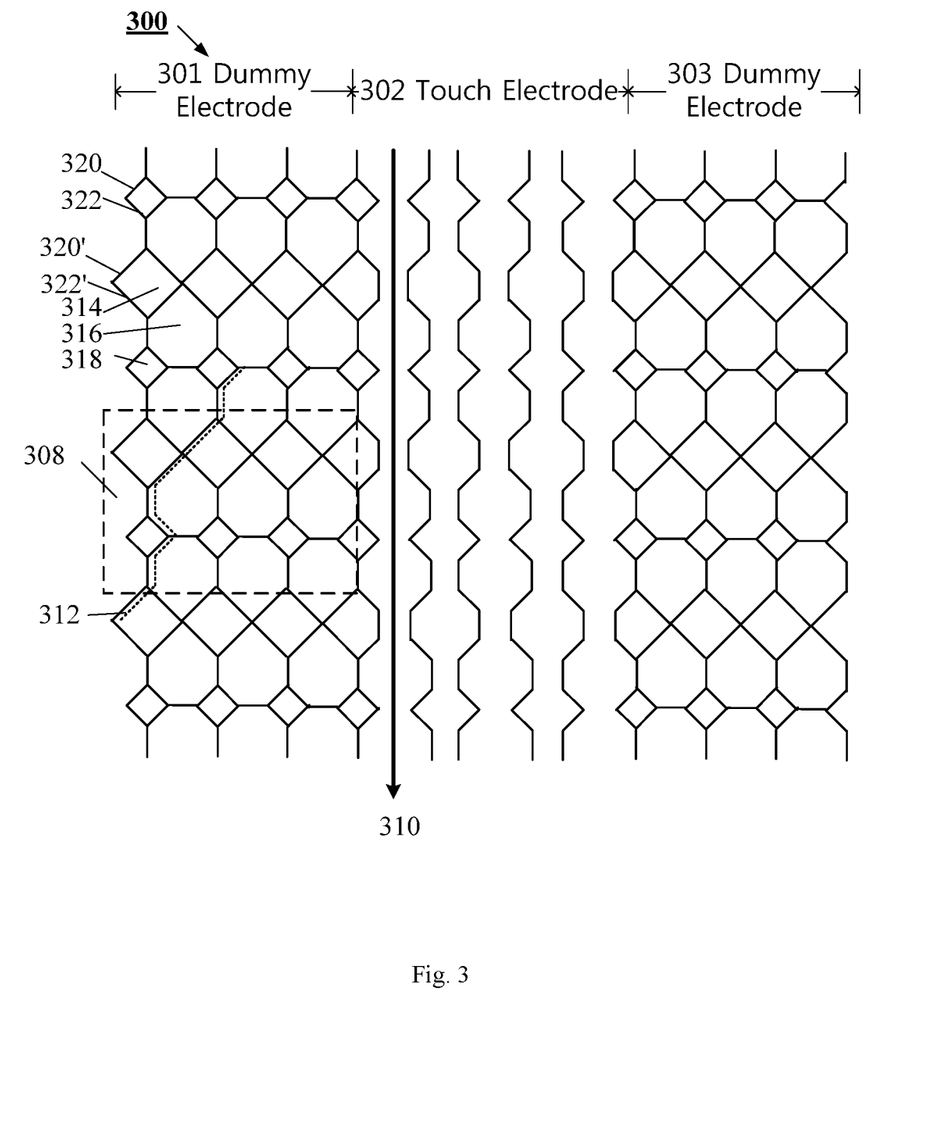
FIG. 3 shows a schematic view of an electrode structure according to another embodiment of the present disclosure.

FIG. 3 shows a partial schematic view of an electrode structure 300 according to another embodiment of the present disclosure. In one embodiment, the electrode structure 300 may be applied to the touch electrode structure, and for example may be applied to the Rx touch electrode structure of an in cell type touch display.

As shown in FIG. 3, the electrode structure 300 comprises a plurality of dummy electrodes 301, 303, and a plurality of touch electrodes 302 (for the sake of brevity, only one touch electrode 302 is shown in FIG. 3). The touch electrode 302 and the dummy electrodes 301, 303 are electrically separated from each other, and the touch electrode 302 and the dummy electrodes 301, 303 are alternately arranged. For example, as shown in FIG. 3, the electrodes are arranged in an order of the dummy electrode 301, the touch electrode 302 and the dummy electrode 303. Further, the touch electrode 302 is arranged to be consisted of octagonal patterns. In another embodiment, the touch electrode 302 may be arranged in any other suitable electrode structure, and is not limited herein. In addition, as shown in FIG. 3, the touch electrode 302 may comprise a plurality of conductive areas which are electrically separated from each other. Each of the dummy electrodes 301, 303 comprises electrodes electrically separated from each other, and in the electrodes electrically separated from each other, some separation borders which are not perpendicular to an extending direction of the first electrode may be connected to form an oblique connecting line with respect to the extending direction. For example, the dummy electrode 301 comprises electrodes 314, 316, 318, which are electrically separated from each other. In another embodiment, the dummy electrode 301 may comprise more or less types of electrodes which are electrically separated from each other.

In FIG. 3, the extending direction of the first electrode (touch electrodes 302) may be a direction shown by a reference numerical 310 in FIG. 3. It can be seen from FIG. 3 that the dotted line indicated by the reference numerical 312 is the oblique connecting line with respect to the extending direction 310, which is formed by connecting some separation borders which are not perpendicular to the extending direction 310. In particular, some oblique separation borders and the separation borders parallel to the extending direction 310 may be connected to form the oblique connecting line with respect to extending direction 310. By contrast, there is no such oblique connecting line in the electrode structure of FIG. 1.

In this embodiment, patterns of some electrodes of the electrodes electrically separated from each other are defined by the oblique separation borders with respect to the extending direction 310, the separation borders parallel to the extending direction 310 and the separation borders perpendicular to the extending direction 310, and patterns of other electrodes are defined by the oblique separation borders with respect to the extending direction 310. As shown in FIG. 3, the patterns of the electrodes 314 and 318 which are electrically separated from each other are defined by the oblique separation borders, and the pattern of the electrically separated electrode 316 is defined by the oblique separation borders, the separation borders parallel to the extending direction 310, and the separation border perpendicular to the extending direction 310. Further, it can be seen from block 308 that the dotted line indicated by a reference numerical 312 is the oblique connecting line with respect to extending direction 310, which is formed by connecting some oblique separation borders and the separation borders parallel to the extending direction 310.

In this embodiment, angles formed by some of the oblique separation borders and the extending direction 310 are 45 degrees, and angles formed by other oblique separation borders and the extending direction 310 are 135 degrees. For example, in FIG. 3, angles formed by oblique separation borders 320, 320' and the extending direction 310 are 45 degrees, and angles formed by oblique separation border 322, 322' and the extending direction 310 are 135 degrees. Moreover, it is to be noted that the angle formed by the oblique separation border and the extending direction described as above is only an example, and in another embodiment, the angle formed by the oblique separation border and the extending direction may also be any other suitable angle.

It is to be noted that the electrode structure in FIG. 3 is only an example embodiment that satisfies the features described as above with respect to the electrode structure 300. In another embodiment, there are also other electrode structures that satisfy the features of the electrode structure 300.

The electrode structure 300 in the above embodiment may effectively improve the problem of a grainy picture. For example, in the case of a white picture or a picture having high brightness, the problem of a grainy picture may be avoided due to the design of the oblique separation border. For example, in block 108 of FIG. 1, a hexagonal pattern may be clearly viewed, while in block 308 of FIG. 3, due to the incorporation of the oblique separation borders and the electrically separated electrodes having different sizes, there is obviously not a hexagonal pattern, such that the reflection is carried out in various directions. Therefore, the electrode structure of the above embodiment can effectively improve the problem of a grainy picture, has a better shadow elimination effect, and can also meet the touch requirements. Further, compared with the electrode structure 200 in FIG. 2, the patterns of the electrically separated electrodes of the electrode structure 300 have more directions, which can more effectively disperse the difference in the optical reflection caused by the separation, and obtain a better viewing angle effect. Further, the separated electrodes have patterns of different sizes, which may avoid the problem of a grainy picture.

Figure 4:
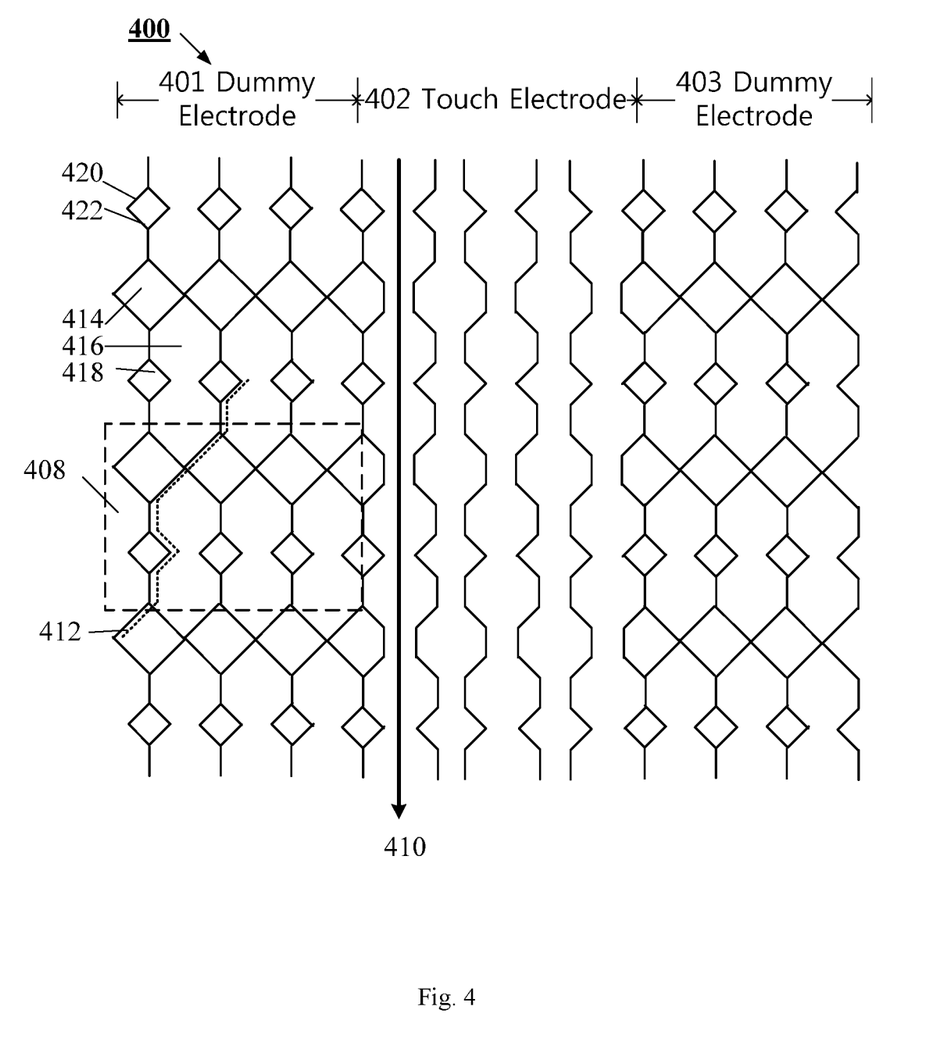
FIG. 4 shows a schematic view of an electrode structure according to yet another embodiment of the present disclosure.

FIG. 4 shows a partial schematic view of an electrode structure 400 according to another embodiment of the present disclosure. In one embodiment, the electrode structure 400 may be applied to the touch electrode structure, and for example may be applied to the Rx touch electrode structure of an in cell type touch display.

As shown in FIG. 4, the electrode structure 400 comprises a plurality of dummy electrodes 401, 403, and a plurality of touch electrodes 402 (for the sake of brevity, only one touch electrode 402 is shown in FIG. 4). The touch electrode 402 and the dummy electrodes 401, 403 are electrically separated from each other, and the touch electrode 402 and the dummy electrodes 401, 403 are alternately arranged. For example, as shown in FIG. 4, the electrodes are arranged in an order of the dummy electrode 401, the touch electrode 402 and the dummy electrode 403. Further, the touch electrode 402 is arranged to be mainly consisted of octagonal patterns. In another embodiment, the touch electrode 402 may be arranged in any other suitable electrode structure, and is not limited herein. In addition, as shown in FIG. 4, the touch electrode 402 may comprise a plurality of conductive areas which are electrically separated from each other. Each of the dummy electrodes 401, 403 comprises electrodes electrically separated from each other, and in the electrodes electrically separated from each other, some separation borders which are not perpendicular to an extending direction of the first electrode may be connected to form an oblique connecting line with respect to the extending direction. For example, the dummy electrode 401 comprises electrodes 414, 416, 418, which are electrically separated from each other. In another embodiment, the dummy electrode 401 may comprise more or less types of electrodes which are electrically separated from each other.

In FIG. 4, the extending direction of the first electrode (touch electrodes 402) may be a direction shown by a reference numerical 410 in FIG. 4. It can be seen from FIG. 4 that the dotted line indicated by the reference numerical 412 is the oblique connecting line with respect to the extending direction 410, which is formed by connecting some separation borders which are not perpendicular to the extending direction 410. In particular, some oblique separation borders and the separation borders parallel to the extending direction 410 may be connected to form the oblique connecting line with respect to extending direction 410. By contrast, there is no such oblique connecting line in the electrode structure of FIG. 1.

In this embodiment, patterns of some electrodes of the electrodes electrically separated from each other are defined by the oblique separation borders with respect to the extending direction 410, and the separation borders parallel to the extending direction 410, and patterns of other electrodes are defined by the oblique separation borders with respect to the extending direction 410. As shown in FIG. 4, the patterns of the electrodes 414 and 418 which are electrically separated from each other are defined by the oblique separation borders, and the pattern of the electrically separated electrode 416 is defined by the oblique separation borders and the separation borders parallel to the extending direction 410. Further, it can be seen from block 408 that the dotted line indicated by a reference numerical 412 is the oblique connecting line with respect to extending direction 410, which is formed by connecting some oblique separation borders and the separation borders parallel to the extending direction 410.

In this embodiment, angles formed by some of the oblique separation borders and the extending direction 410 are 45 degrees, and angles formed by other oblique separation borders and the extending direction 410 are 135 degrees. For example, in FIG. 4, an angle formed by an oblique separation border 420 and the extending direction 410 is 45 degrees, and an angle formed by an oblique separation border 422 and the extending direction 410 are 135 degrees. Moreover, it is to be noted that the angle formed by the oblique separation border and the extending direction described as above is only an example, and in another embodiment, the angle formed by the oblique separation border and the extending direction may also be any other suitable angle.

It is to be noted that the electrode structure in FIG. 4 is only an example embodiment that satisfies the features described as above with respect to the electrode structure 400. In another embodiment, there are also other electrode structures that satisfy the features of the electrode structure 400.

The electrode structure 400 in the above embodiment may effectively improve the problem of a grainy picture. For example, in the case of a white picture or a picture having high brightness, the problem of a grainy picture may be avoided due to the design of the oblique separation border. For example, in block 108 of FIG. 1, a hexagonal pattern may be clearly viewed, while in block 408 of FIG. 4, due to the incorporation of the oblique separation borders and the electrically separated electrodes having different sizes, there is obviously not a hexagonal pattern, such that the reflection is carried out in various directions. Therefore, the electrode structure of the above embodiment can effectively improve the problem of a grainy picture, has a better shadow elimination effect, and can also meet the touch requirements. Further, compared with the electrode structure 200 in FIG. 2, the patterns of the electrically separated electrodes of the electrode structure 400 have more directions, which can more effectively disperse the difference in the optical reflection caused by the separation, and obtain a better viewing angle effect. Further, the separated electrodes have patterns of different sizes, which may avoid the problem of a grainy picture.

According to various embodiments, the electrodes electrically separated from each other comprise at least two electrode patterns. For example, the electrically separated electrodes of the electrode structures 200, 300, 400 comprise at least two electrode patterns.

According to various embodiments, the patterns of the electrodes electrically separated from each other are arranged to be patterns repeated periodically. For example, the patterns of the electrically separated electrodes of the electrode structures 200, 300, 400 are arranged to be patterns repeated periodically. For example, the patterns 414, 416 and 418 of the electrically separated electrodes in FIG. 4 are arranged periodically in a way as shown.

According to various embodiments, a plurality of first electrodes and a plurality of second electrodes are made of the same transparent material (for example, ITO).

It is to be noted that the electrode structures as shown are only exemplary. In another embodiment, the size, quantity, and type of the electrode patterns in the electrode structure may be varied.

Figure 5:
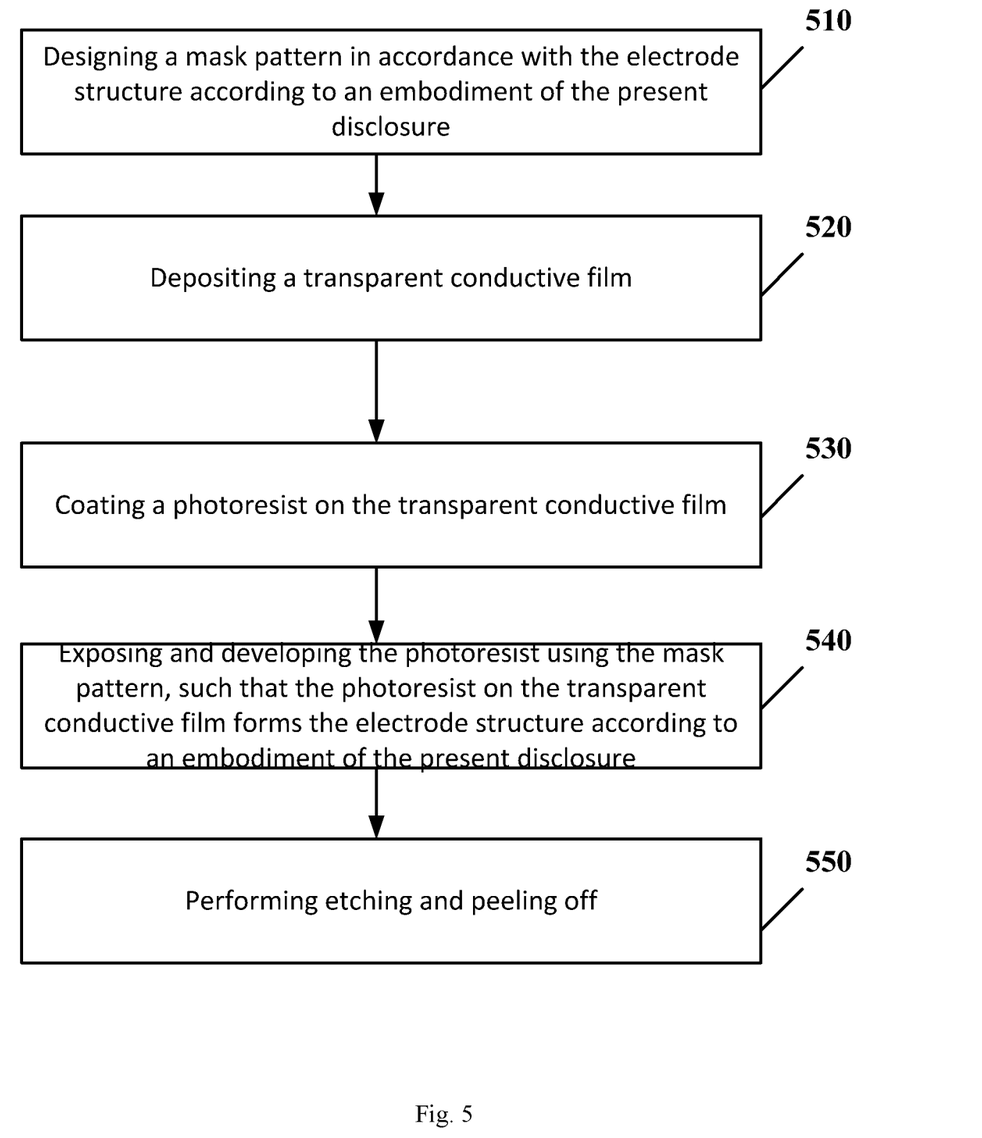
FIG. 5 shows a flow chart of a method of manufacturing an electrode structure according to an embodiment of the present disclosure.

FIG. 5 shows a manufacturing method of an electrode structure according to an embodiment of the present disclosure. The method comprises a step 510 of designing a mask pattern in accordance with the electrode structure (for example, electrode structure 200, 300 or 400) of the above embodiment. At step 520, for example, a transparent conductive film (for example, ITO film) is deposited on a color film (CF) substrate, wherein deposition may be performed by using any suitable deposition technique that is available now or will be developed in future, and is not limited herein. At step 530, a photoresist is coated on the transparent conductive film, wherein the photoresist may be any suitable type of photoresist that is applied in the manufacturing of a display, and is not limited herein. At step 540, the photoresist is exposed and developed using the mask pattern, such that the photoresist on the transparent conductive film forms electrode structure (for example, electrode structure 200, 300 or 400) of the above embodiment. At step 550, etching and peeling off are performed to form the electrode structure such as electrode structure 200, 300 or 400 of the above embodiment. The various operations in steps 510-550 described above may be performed by using any applicable techniques that are available now or will be developed in future, and are not limited herein. The electrode structure such as electrode structure 200, 300 or 400 described as above manufactured by the method 500 can also improve the problem of a grainy picture, has a better shadow elimination effect, and can also meet the touch requirements.

In one embodiment, the present disclosure also provides a touch panel comprising the electrode structure such as the electrode structure 200, 300 or 400 according to an embodiment of the present disclosure. For example, in the in cell type touch panel, the electrode structure 200, 300 or 400 may be used as the Rx electrode. The touch panel may be any suitable touch panel using the electrode structure according to an embodiment of the present disclosure.

In one embodiment, the present disclosure also provides a touch display device comprising the touch panel according to an embodiment of the present disclosure.

The terminology used herein is for the purpose of describing particular embodiments only and is not intended to be limiting of the embodiments. As used herein, the singular forms "a", "an" and "the" are intended to include the plural forms as well, unless the context clearly indicates otherwise. It will be further understood that the terms "comprises," "comprising," "includes" and/or "including" specify the presence of stated features, integers, operations, elements, and/or components, but do not preclude the presence or addition of one or more other features, integers, steps, operations, elements, components, and/or groups thereof.

It is also to be noted that in some alternative implementations, the illustrated functions/actions may not occur in the order illustrated in the drawings. If desired, the different functions described in this disclosure may be performed in a different order and/or concurrently with each other. In addition, if desired, one or some functions of the above functions may be unnecessary or may be combined.

While the embodiments of the present disclosure have been described above with reference to the accompanying drawings, it will be understood by those skilled in the art that the foregoing description is by way of example only and is not intended to be limiting of the present disclosure. Various modifications and variations of the embodiments of the present disclosure may be made therein without departing from the spirit and scope of the disclosure, the scope of which is to be determined only by the appended claims.

What is claimed is:

1. An electrode structure, comprising:
a plurality of first electrodes, an entirety of each of the first electrodes extending in a first direction and transferring an electrical signal in the first direction; and
a plurality of second electrodes, which do not transfer the electrical signal,
wherein the first electrode and the second electrode are electrically separated from each other, the second electrode and the first electrode are alternately arranged, each of the second electrodes comprises a plurality of electrodes electrically separated from each other, and edges of a pattern of each of the plurality of the electrodes electrically separated from each other are separation borders, and
wherein the plurality of the electrodes are electrically separated from each other via the separation borders, and are divided into a plurality of electrode columns which extend in the first direction respectively, and patterns of the plurality of the electrodes in each of the electrode columns are substantially the same, and
wherein some separation borders which are not perpendicular to the first direction of the first electrode, and located in different electrode columns are connected to form an oblique straight connecting line with respect to the first direction,
wherein a first electrode pattern and a second electrode pattern are in one of the plurality of electrode columns, and the first electrode pattern and the second electrode pattern are separated by a first separation border;
wherein the first electrode pattern and a third electrode pattern are two adjacent electrode patterns which are in two of the plurality of electrode columns respectively, and the first electrode pattern and the third electrode pattern are separated by a second separation border;
wherein the first separation border and a portion of the second separation border are in one straight line which is not perpendicular to the first direction, wherein the patterns of the plurality of the electrodes electrically separated from each other are arranged to be patterns repeated periodically.

2. The electrode structure of claim 1, wherein a pattern of each of the plurality of the electrodes electrically separated from each other is defined by oblique separation borders with respect to the first direction.

3. The electrode structure of claim 2, wherein angles formed by some of the oblique separation borders and the first direction are 30 degrees, and angles formed by the remaining oblique separation borders and the first direction are 150 degrees.

4. The electrode structure of claim 1, wherein the patterns of some of the plurality of the electrodes electrically separated from each other are defined by oblique separation borders with respect to the first direction and separation borders parallel to the first direction, and patterns of other electrodes are defined by the oblique separation borders.

5. The electrode structure of claim 1, wherein the patterns of some of the plurality of the electrodes electrically separated from each other are defined by oblique separation borders with respect to the first direction, separation borders parallel to the first direction and separation borders perpendicular to the first direction, and the patterns of other electrodes are defined by the oblique separation borders with respect to the first direction.

6. The electrode structure of claim 4, wherein in the plurality of the electrodes electrically separated from each other, some oblique separation borders and the separation border parallel to the first direction can be connected to form the oblique connecting line with respect to the first direction.

7. The electrode structure of claim 4, wherein angles formed by some of the oblique separation borders and the first direction are 45 degrees, and angles formed by other oblique separation borders and the first direction are 135 degrees.

8. The electrode structure of claim 1, wherein the plurality of the electrodes electrically separated from each other comprise at least two electrode patterns.

9. The electrode structure of claim 1, wherein the plurality of the first electrodes and the plurality of the second electrodes are made of the same transparent material.

10. A method of manufacturing an electrode structure, comprising:
   designing a mask pattern in accordance with the electrode structure of claim 1;
   depositing a transparent conductive film;
   coating a photoresist on the transparent conductive film;
   exposing and developing the photoresist using the mask pattern, such that the photoresist on the transparent conductive film forms the electrode structure of claim 1; and
   performing etching and peeling off.

11. A touch panel, comprising the electrode structure of claim 1.

12. A touch display device, comprising the touch panel of claim 11.

13. The electrode structure of claim 5, wherein in the plurality of the electrodes electrically separated from each other, some oblique separation borders and the separation border parallel to the first direction can be connected to form the oblique connecting line with respect to the first direction.

14. The electrode structure of claim 5, wherein angles formed by some of the oblique separation borders and the first direction are 45 degrees, and angles formed by other oblique separation borders and the first direction are 135 degrees.

* * * * *